United States Patent
Nordström et al.

(10) Patent No.: US 9,445,424 B2
(45) Date of Patent: *Sep. 13, 2016

(54) RADIO BASE STATION AND METHOD FOR SCHEDULING RADIO RESOURCES FOR USER EQUIPMENT

(75) Inventors: Björn Nordström, Stockholm (SE); Eddie Corbett, Vallentuna (SE); Ying Sun, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 353 days.

This patent is subject to a terminal disclaimer.

(21) Appl. No.: 13/880,121

(22) PCT Filed: Nov. 10, 2010

(86) PCT No.: PCT/SE2010/051234
§ 371 (c)(1),
(2), (4) Date: Apr. 18, 2013

(87) PCT Pub. No.: WO2012/064241
PCT Pub. Date: May 18, 2012

(65) Prior Publication Data
US 2013/0215784 A1    Aug. 22, 2013

(51) Int. Cl.
  *H04L 1/00*  (2006.01)
  *H04W 72/08*  (2009.01)
(52) U.S. Cl.
  CPC .................. *H04W 72/085* (2013.01)
(58) Field of Classification Search
  CPC .................................................. H04W 72/085
  USPC ........................................................ 370/252
  See application file for complete search history.

(56) References Cited

U.S. PATENT DOCUMENTS 7,917,164 B2 *  3/2011  Rao ....................... H04W 52/10
                                                                        455/522
8,811,367 B2   8/2014  Nelson, Jr. et al.
(Continued)

FOREIGN PATENT DOCUMENTS

EP    1734778 A1    12/2006
EP    1887709 A1    2/2008
(Continued)

OTHER PUBLICATIONS

Feng, Minghai, et al., "Coordinated Scheduling Based on Overload Indicator for LTE/LTE-A Uplink," Vehicular Technology Conference, Fall 2010 IEEE 72nd, pp. 1-5, 6-9. Section III A. Sep. 2010.
(Continued)

*Primary Examiner* — Faisal Choudhury
(74) *Attorney, Agent, or Firm* — Coats & Bennett, PLLC

(57) ABSTRACT

Embodiments herein relate to a method in a radio base station (12) for scheduling a radio resource to a first user equipment (10). The radio base station (12) is comprised in a radio communications network and controls a number of radio resources to be scheduled for communication to a number of user equipments (10,11). The number of user equipments comprises the first user equipment (10) and being served by the radio base station (12). The scheduling is based on channel quality of channels used by the respective user equipments. The radio base station (12) estimates a first channel quality of a channel used by the first user equipment (10). The radio base station determines a pathloss between the first user equipment (10) and the radio base station (12), and computes a second channel quality of the channel based on the estimated first channel quality and the determined pathloss. The radio base station (12) then schedules a radio resource out of the number of radio resources to the first user equipment (10) based on the second channel quality.

18 Claims, 6 Drawing Sheets

(56) References Cited

U.S. PATENT DOCUMENTS

| | | |
|---|---|---|
| 2004/0100941 A1* | 5/2004 | Lim et al. ............. 370/349 |
| 2007/0042784 A1 | 2/2007 | Anderson |
| 2007/0254601 A1* | 11/2007 | Li et al. ............. 455/88 |
| 2008/0188260 A1 | 8/2008 | Xiao et al. |
| 2008/0205333 A1 | 8/2008 | Budianu et al. |
| 2009/0154411 A1* | 6/2009 | Kikuchi et al. ......... 370/329 |
| 2009/0175361 A1* | 7/2009 | Roh et al. ............ 375/253 |
| 2010/0015923 A1* | 1/2010 | Golitschek ............ 455/67.7 |
| 2010/0135236 A1 | 6/2010 | Wang et al. |
| 2010/0157909 A1* | 6/2010 | Miura et al. ........... 370/329 |
| 2010/0177721 A1 | 7/2010 | Simonsson et al. |
| 2010/0238881 A1* | 9/2010 | Hou et al. ............ 370/329 |
| 2010/0246463 A1* | 9/2010 | Papasakellariou .. H04W 52/146 370/311 |
| 2011/0009142 A1* | 1/2011 | Higuchi ............. 455/509 |
| 2011/0014926 A1* | 1/2011 | Baligh ............ H04L 1/0026 455/452.2 |
| 2011/0300873 A1* | 12/2011 | Wen et al. ............ 455/450 |
| 2012/0008489 A1* | 1/2012 | Higuchi et al. ......... 370/203 |
| 2012/0014482 A1* | 1/2012 | Yu et al. ............. 375/341 |
| 2012/0082041 A1* | 4/2012 | Damnjanovic ..... H04W 52/365 370/252 |
| 2012/0129562 A1 | 5/2012 | Stamoulis et al. |
| 2013/0029706 A1* | 1/2013 | Sachs ............ H04W 16/14 455/501 |

FOREIGN PATENT DOCUMENTS

| | | |
|---|---|---|
| EP | 2096807 A1 | 9/2009 |
| EP | 2237456 A1 | 10/2010 |
| WO | 2006133023 A2 | 12/2006 |
| WO | 2008050230 A2 | 5/2008 |
| WO | 2008130297 A1 | 10/2008 |
| WO | 2008135101 A1 | 11/2008 |
| WO | 2008156417 A2 | 12/2008 |
| WO | WO 2010096946 A1 * | 9/2010 |
| WO | WO 2010101111 A1 * | 9/2010 |

OTHER PUBLICATIONS

Catt: "Signalling Information for Node-B Controlled Uplink Scheduling and Text Proposal for TR 25.827," 3GPP TSG RAN WG1 #46, Tallinn, Estonia, R1-062419, Section 2.

IPWireless: "Uplink IoT management using only server-cell Uu control," 3GPP TSG RAN WG1 #48bis, St. Julian, Malta, R1-071274, Mar. 26, 2007, Section 1.

Rahman, M., et al., "Inter-Cell Interference Coordination in OFDMA Networks: A Novel Approach Based on Integer Programming," Vehicular Technology Conference, Spring 2010, IEEE 71st, pp. 1-5, 16-19. Section III. May 2012.

3rd Generation Partnership Project, "3rd Generation Partnership Project; Technical Specification Group Radio Access Network; Evolved Universal Terrestrial Radio Access (E-UTRA); Physical Channels and Modulation (Release 9)." 3GPP TS 36.211 V9.1.0, Mar. 2010.

* cited by examiner

RADIO BASE STATION AND METHOD FOR SCHEDULING RADIO RESOURCES FOR USER EQUIPMENT

TECHNICAL FIELD

Embodiments herein relate to a radio base station and a method therein. In particular embodiments herein relate to schedule a radio resource in a radio communications network.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA) system, Global System for Mobile communications/Enhanced Data rate for GSM Evolution (GSM/EDGE), Worldwide Interoperability for Microwave Access (WiMax), or Ultra Mobile Broadband (UMB), just to mention a few.

LTE is a Frequency Division Multiplexing technology wherein Orthogonal Frequency Division Multiplexing (OFDM) is used in a downlink (DL) transmission from a radio base station to a user equipment (UE). Single Carrier—Frequency Domain Multiple Access (SC-FDMA) is used in an uplink (UL) from the user equipment to the radio base station. Services in LTE are supported in the packet switched domain.

In a time domain, one subframe of 1 ms duration is divided into 12 or 14 OFDM, or SC-FDMA, symbols, depending on a configuration of the subframe. One OFDM or SC-FDMA symbol comprises a number of sub carriers in the frequency domain, depending on a channel bandwidth and configuration. One OFDM or SC-FDMA symbol on one sub carrier is referred to as a Resource Element (RE).

In LTE no dedicated data channels are used, instead shared channel resources are used in both downlink and uplink. These shared resources, Downlink Shared Channel (DL-SCH) and Uplink Shared Channel (UL-SCH), are each controlled by one scheduler in the radio base station, which scheduler assigns different parts of the downlink and uplink shared channels to different user equipments for reception and transmission respectively.

The schedulers are in full control of in which subframe a user equipment should receive a DL-SCH transmission and which subframe the user equipment is allowed to transmit on UL-SCH. Scheduling decisions are sent to the user equipment as downlink assignments and uplink grants. Downlink assignment information and uplink grants are transmitted in Downlink Control Information (DCIs) using L1/L2 control signaling. A downlink assignment message indicates if there is data to be received for the user equipment on the DL-SCH.

For an UL transmission, a bandwidth resource assigned to one user equipment is always a set of contiguous scheduling blocks (SBs) due to the constraints of the SC-FDMA transmission scheme. The bandwidth resources are indicated in the DCI by a start SB and an allocation size in number of SBs. LTE supports full dynamic scheduling, which means that the bandwidth resource assigned to the user equipment is set to be valid only for one subframe. In a next subframe, the same bandwidth resource may be allocated to a different user equipment.

Dynamic scheduling enables multiple user equipments to share all, or parts of, available frequency resources in one subframe; all, or parts of, frequency resources are assigned to one user equipment; and no user equipments are allocated any frequency resources.

A resulting resource allocation over time and frequency depends both on properties of the user equipments in the system, i.e. the number of user equipments, traffic models of the user equipments, radio channel characteristics, and an algorithm implementing a scheduling functionality. A strategy defining in which way resources in time and frequency are allocated to a set of user equipments is commonly referred to as a scheduling algorithm.

The choice of scheduling algorithm gives rise to different behavior of a radio communications network and how a user of a user equipment experiences performance of the radio communications network. One scheduling algorithm may prioritize fulfilling delay constraints of data traffic, another scheduling algorithm may prioritize to let user equipments located near the cell center experience peak bit rates, whilst a third scheduling algorithm may share resources in time and frequency as fair as possible among the user equipments in the cell. That is, given a specific scenario of a radio communications network, i.e. characteristics of the user equipments, cell sizes and fading environments etc., different scheduling algorithms may give different performance of the radio communications network.

A fairness of a scheduling algorithm is a measure based on a performance of a user equipment located near a cell edge of a cell, also referred to as a cell edge user equipment, compared to a capacity of the cell serving the user equipment. It is often defined as the 5th or 10th percentile user bit rate compared to an average user bit rate in the cell. Scheduling algorithms that prioritize user equipments that have a good channel condition perform so called a channel dependent scheduling. The channel dependent scheduling utilizes a multi user equipment diversity, where multiple user equipments are spread out in the cell and thus the user equipments experience different channel quality dips at different frequencies and at different times. A pure channel dependent scheduling algorithm always prioritizes the user equipment that has a good radio condition. A result is that a throughput of the cell will be maximized; however user equipments in bad channel conditions may be starved. The pure channel dependent scheduling is therefore said to be unfair.

Proportional fair (PF) scheduling adds control of an overall fairness in the radio communications network by prioritizing user equipments not only on based on a channel quality of the user equipment but also on a rate of a transmission. The overall fairness of the scheduling is controlled by steering a proportion of the two components, i.e. instantaneous channel quality and an average rate of flow. PF scheduling is implemented by prioritizing the user equipments using a weight function W defined as $$W=(1-CQF) \cdot W_R + CQF \cdot W_{CQ}$$

where
$W_R$ is a weight depending on the rate of a flow,
$W_{CQ}$ is a weight depending on the channel quality, and
CQF stands for a Channel Quality Fraction (CQF) parameter that controls a relation between the two weight components, i.e. proportion between channel dependency and rate in the scheduling weight.

The PF scheduling strategy is able to utilize channel variations to improve overall cell throughput while still ensuring the fairness between UEs.

As previously described, LTE enables dynamic scheduling where resources are orthogonal in frequency domain enabling channel dependent scheduling to be used in both time and frequency. To prioritize which resources in frequency domain that should be allocated to a UE is called Frequency Selective Scheduling (FSS). If applied in an LTE scenario, an optimal frequency selective scheduler would only assign resources to a UE where a gain-to-interference ratio (GIR) is high. UEs may report to the radio base station CQI reports based on measurements of SINR on downlink reference signals of known power. The radio base station then calculates GIR corresponding to the received measurements of SINR. A higher GIR indicates a better subband and is defined as a signal power gain over interference.

One way of implementing FSS is to implement proportional fair scheduling, where the channel quality measure is based both on time and frequency variations, that is, proportional fair in time and frequency. PF in time and frequency is believed to ensure higher cell throughput and fairness among UEs.

Frequency selective scheduling algorithms solutions of today require immense computation power to find an optimized solution. One example of such solutions is to compute number of bits as the channel quality measure. That requires performing link adaptation before making scheduling decision which is connected to very high computational complexity. A simple channel quality metric is crucial to realize frequency selective scheduling in reality. Typical channel quality measures, which are more feasible for implementation, are Gain to Interference and Noise Ratio (GINR) or Signal to Interference and Noise Ratio (SINR). However, methods using both these typical channel quality measures have associated problems. Using GINR, the scheduler in the radio base station tends to favour UEs in a centre of the cell. SINR is a good channel quality measure, but it is hard to estimate SINR before knowing where and how many resource blocks are allocated.

SUMMARY

An object of embodiments herein is to provide a radio base station and a method that schedules resources to a user equipment in an efficient manner.

According to a first aspect of embodiments herein the object is achieved by a method in a radio base station for scheduling a radio resource to a first user equipment. The radio base station is comprised in a radio communications network and controls a number of radio resources to be scheduled for communication to a number of user equipments. The number of user equipments comprises the first user equipment. The user equipments are served by the radio base station. The scheduling in the radio base station is based on channel quality of channels used by the respective user equipment.

The radio base station estimates a first channel quality of a channel used by the first user equipment. The radio base station further determines a pathloss between the first user equipment and the radio base station. Additionally, the radio base station computes a second channel quality of the channel based on the estimated first channel quality and the determined pathloss. Furthermore, the radio base station then schedules a radio resource out of the number of radio resources to the first user equipment based on the computed second channel quality.

According to a second aspect of embodiments herein the object is achieved by a radio base station for scheduling a radio resource to the first user equipment. The radio base station is arranged to be comprised in a radio communications network and to control a number of radio resources. The radio resources are to be scheduled for communication to a number of user equipments comprising the first user equipment. The number of user equipments are served by the radio base station. The radio base station is arranged to schedule radio resources based on channel quality of channels used by the respective user equipment.

The radio base station comprises an estimating circuit configured to estimate a first channel quality of a channel used by the first user equipment. The radio base station further comprises a determining circuit configured to determine a pathloss between the first user equipment and the radio base station. Also, the radio base station comprises a computing circuit configured to compute a second channel quality of the channel based on the first channel quality and the determined pathloss. In addition, the radio base station comprises a scheduling circuit arranged to schedule a radio resource out of the number of radio resources to the user equipment based on the computed second channel quality.

Embodiments herein aim to add pathloss compensation to a channel quality measure in a channel dependent scheduling. Fast channel quality variations in time and frequency domain may be obtained by compensating a long term channel variation pathloss. Embodiments herein also enable a fair scheduling among served user equipments throughout the cell by adding the pathloss compensation and some embodiments also reduce inter cell interference.

BRIEF DESCRIPTION OF THE DRAWINGS

Embodiments will now be described in more detail in relation to the enclosed drawings, in which.

DETAILED DESCRIPTION

Figure 1:
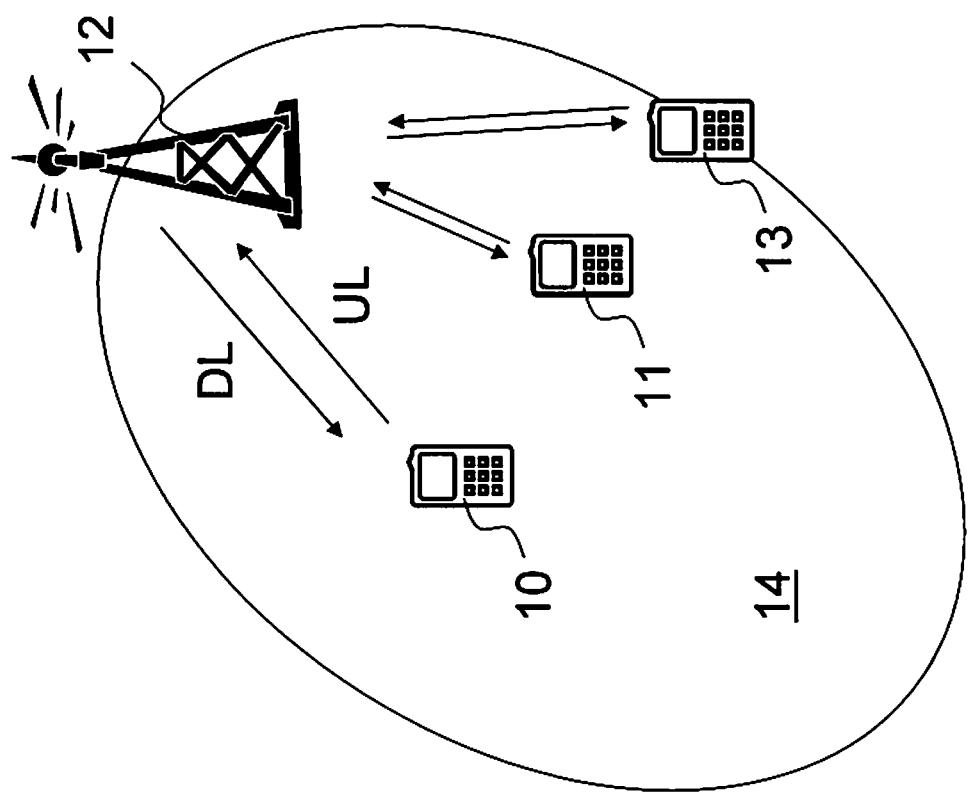
FIG. 1 is a block diagram depicting a radio communications network.

FIG. 1 provides a general overview of a radio communications network. The radio communications network may be a network according to a standard, such as a Long Term Evolution (LTE), LTE-Advanced, 3rd Generation Partnership Project (3GPP) Wideband Code Division Multiple Access (WCDMA) system, Global System for Mobile communications/Enhanced Data rate for GSM Evolution (GSM/EDGE), Worldwide Interoperability for Microwave Access (WiMax), or Ultra Mobile Broadband (UMB), just to mention some few arbitrary possible options.

In the radio communication networks a first user equipment 10 is communicating with a radio base station 12 by transmitting data to the radio base station 12. The data is transmitted from the first user equipment 10 to the radio base station 12 in an uplink (UL) transmission, wherein the first user equipment 10 transmits data using a transmission power. Data transmitted from the radio base station 12 to the first user equipment 10 is referred to as a downlink (DL) transmission. Also a second user equipment 11 is served by the radio base station 12 as well as a third user equipment 13. The radio base station 12 controls a cell 14, in which the first, second and third user equipment 10,11,13 are served. The cell 14 provides radio coverage over a geographical area.

It should here be mentioned that the radio base station 12 also may be referred to as e.g. a NodeB, an evolved Node B (eNB, eNode B), a base transceiver station, Access Point Base Station, base station router, or any other network unit capable to communicate with a user equipment within the cell 14 served by the radio base station 12, depending e.g. of the radio access technology and terminology used. Each user equipment 10,11,13 may e.g. be represented by a wireless communication terminal, a mobile cellular phone, a Personal Digital Assistant (PDA), a wireless platform, a laptop, a computer or any other kind of device capable to communicate wirelessly with the radio base station 12.

The radio base station 12 comprises a scheduling algorithm to provide a spectrum efficient and fair scheduling of radio resources controlled by the radio base station 12. A radio resource may be a resource element, a resource block, or any resource enabling communication between the radio base station 12 and the user equipment 10.

According to embodiments herein the scheduling algorithm takes the pathloss between the user equipments 10,11, 13 and the radio base station 12 into consideration. Thereby, the spatial component, i.e. the pathloss, is removed fully or partly from the channel quality measurement of the user equipments 10,11,13. Thus, the radio base station 12 may schedule one or more radio resources to the different user equipments 10,11,13 based on a channel quality that has been computed based on pathloss. The radio base station 12 may further schedule a radio resource to the user equipments 10,11,13 further based on a rate of flow of a transmission to be transmitted from respective user equipment 10,11,13. Hence, embodiments herein disclose a scheduling that may prioritize a user equipment based on a combination of the channel quality of the channel used by the user equipment and the rate of flow over the channel, which channel quality has been computed using pathloss as a parameter.

Figure 2:
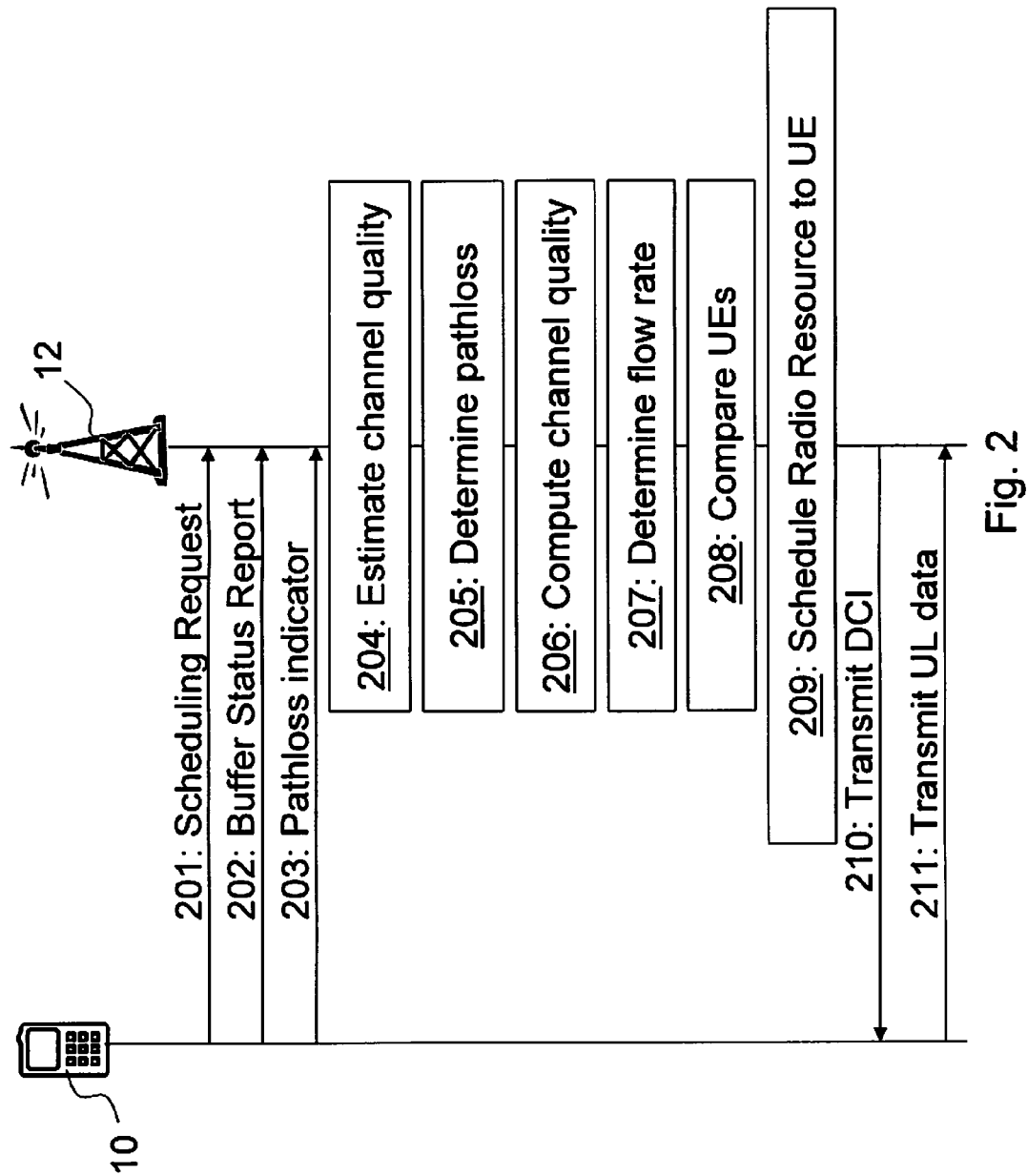
FIG. 2 is a combined signalling and flow chart in a radio communications network.

FIG. 2 is a combined signalling and flow chart scheme depicting embodiments herein in the radio communications network. The steps may be performed in any suitable order.

Step 201. The first user equipment 10 wishes to transmit data and therefore sends a request for scheduling a transmission in an uplink transmission. The request may be any transmission request such as a Scheduling Request (SR) or the like.

Step 202. The user equipment 10 may then send a buffer status report indicating an amount of data to be transmitted or an indication of a rate of bits to be communicated over the channel.

Step 203. The user equipment 10 may further send a pathloss indication to the radio base station 12. For example, the user equipment 10 may with a periodicity send power headroom reports to the radio base station 12. The power headroom report provides a measure of how close a transmit power spectral density (PSD) of the user equipment 10 is to a maximum PSD limit, i.e. indicating the pathloss. The maximum PSD limit may be derived from a maximum user equipment transmit power, e.g. in the order of 24 dBm, and a minimum bandwidth, e.g. 1 Physical Resource Block (PRB).

Step 204. The radio base station 12 estimates a first channel quality used by the user equipment 10 by e.g. determining a GINR of the channel. The GINR may be determined based on measured received power at the radio base station 12 and transmission power used at the user equipment 10 to transmit over the channel. This transmission power may be reported from the user equipment 10 or retrieved from within the radio base station 12. Also interference and noise are parts of the calculation of GINR. Other channel quality indications may be used as well such as Gain to Interference Ratio (GIR), Carrier to Interference (C/I), Signal to Interference and Noise Ratio (SINR) or the like.

Step 205. The radio base station 12 determines the pathloss from the user equipment 10 towards the radio base station 12. For example, the radio base station 12 may determine the pathloss based on an indication received from the user equipment in e.g. a power headroom report or the like.

Step 206. The radio base station 12 computes a second channel quality based on the estimated first channel quality and the determined pathloss. The second channel quality, also referred to as a compensated first channel quality, may be computed on GINR with compensated pathloss as follows $$GINR_{comp} = GINR_{est} + \tau \cdot PL \qquad (i)$$

where
$GINR_{comp}$ is the second channel quality defined as compensated GINR in dB,
$GINR_{est}$ is the estimated first channel quality defined as estimated GINR in dB,
PL is pathloss in dB, and
$\tau$ is a fractional indicator parameter.

The purpose is to partly or fully remove the spatial component from the user equipment's 10 channel quality measure, which is done by adding pathloss to the channel quality. By removing the spatial component, a fast channel quality variation in time and frequency can be utilized in channel dependent scheduling. The parameter $\tau$ controls the fraction of the pathloss that should be compensated. This fraction of the pathioss controls the degree of fairness between different user equipments 10,11,13 in the cell 14, when using a channel dependent scheduling algorithm.

Embodiments herein provide pathloss compensation for the whole user equipment population in the cell 14, i.e. user equipments 10,11,13 in FIG. 1. In certain radio communications networks realizations using compensation for every user equipment 10,11,13 in the cell 14 may be unfavourable since some user equipments that have poor channel quality may lower the overall system performance. Embodiments herein are further improved by not applying the pathloss compensation for a certain percentage of the user equipments 10,11,13 within the cell 14. Equation (i) is therefore extended as follows $$GINR_{comp} = GINR_{est} + \min(\tau \cdot PL, \beta \cdot PL_{cell\text{-}edge}) \qquad (ii)$$

where
$\min(\tau \cdot PL, \beta \cdot PL_{cell\text{-}edge})$ defines that the fraction $\tau$ of the pathloss is compensated for user equipments having pathloss less than $\beta \cdot PL_{cell\text{-}edge}$. $\beta$ is a threshold value of a fraction of the pathloss for a user equipment at the cell edge of the cell 14. The user equipments 10,11,13 that are down-prioritized with the threshold $\beta$ are user equipments that have worse channel quality than a cell edge user equipment.

If $\beta$ is not used, a user equipment 10,11,13 with very higher pathloss than a cell edge user equipment will potentially be scheduled lots of times if its flow rate is very low, see equation (iii) below. On the same time its compensated GINR, $GINR_{comp}$, is quite high. This way, the overall cell throughput may possibly fall to very low numbers.

Thus, the use of $\beta$ will improve the robustness of the scheduling.

Step 207. The radio base station 12 may also determine a rate of a flow over the channel. This may be determined based on actual transmissions or based on received buffer status reports. As all data transmitted from the user equipment 10 is passing through the radio base station 12 the rate is usually measured based the actual transmissions from the user equipment.

Step 208. The radio base station 12 may then compare the second channel quality of the user equipment 10 with a third channel quality of another channel used by the second user equipment 11. This comparison may further comprise to compare weight values of the different channels of the different user equipments 10,11 of a weight function. The weight function may take both compensated channel quality and rate of the flow into account.

For example, a weight function W may be defined as $$W = (1-CQF) \cdot W_R + CQF \cdot W_{CQ} \quad \text{(iiii)}$$

where
$W_R$ is a weight depending on the rate of a flow,
$W_{CQ}$ is a weight depending on the channel quality, and
CQF stands for a Channel Quality Fraction (CQF) parameter that controls a relation between the two weight components, i.e. proportion between channel dependency and rate in the weight.

The weight of each user equipment channel may then be compared.

Step 209. The radio base station 12 then schedules a radio resource such as one or more radio resource blocks over a transmission time interval based on the second channel quality, for example, as illustrated based on the comparison in step 208. The radio base station 12 may prioritize the scheduling of the radio resource to the first user equipment 10 when, for example, the second channel quality is better than the third channel quality.

Also, a fairness parameter may be implemented by adding the rate of flow into the comparison. Thus, some user equipment with a low flow rate and a low compensated first channel quality may be prioritized before a user equipment with a very high rate of flow and a better compensated first channel quality.

The value of the pathloss compensation fraction τ is e.g. set from an operator or set by an automatic network tuning based on statistics in the radio communications network. By adjusting τ the radio communications network performance in terms of fairness and spectrum efficiency is tunable and optimized.

Step 210. The radio base station 12 then transmits information regarding the scheduled radio resource. The information may be sent in Downlink Control information (DCI) from the radio base station 12. For an UL transmission, a bandwidth resource assigned to a user equipment may always be a set of contiguous scheduling blocks (SBs) due to the constraints of the SC-FDMA transmission scheme. The radio resource or resources are indicated in the DCI by a start scheduling block (SB) and an allocation size in number of SBs for UL. LTE supports full dynamic scheduling, which means that the radio resource assigned to the UE 10 is set to be valid only for one subframe. In a next subframe, the same radio resource may be allocated to a different user equipment. Thus, the radio base station 12 may send an uplink (UL) grant to the user equipment 10. The uplink grant assigns uplink resources to transmission from the user equipment 10.

Step 211. The user equipment 10 then transmits data such as uplink data on the scheduled or assigned radio resources.

Embodiments herein provide both increased throughput for a user equipment at an edge of the cell 14 and also cell throughput in the radio communications network using channel dependent scheduling. Embodiments herein also reduces inter cell interference between cells, and improves fairness in the system. For example, scheduling the user equipment at the cell edge with the best channel condition will improve the transmitted number of bits per second. For File Transfer Protocol (FTP) type of traffic which has limited number of bits to transmit, the required transmitted power is lower, resulting in a lower inter cell interference to other cells.

Figure 3:
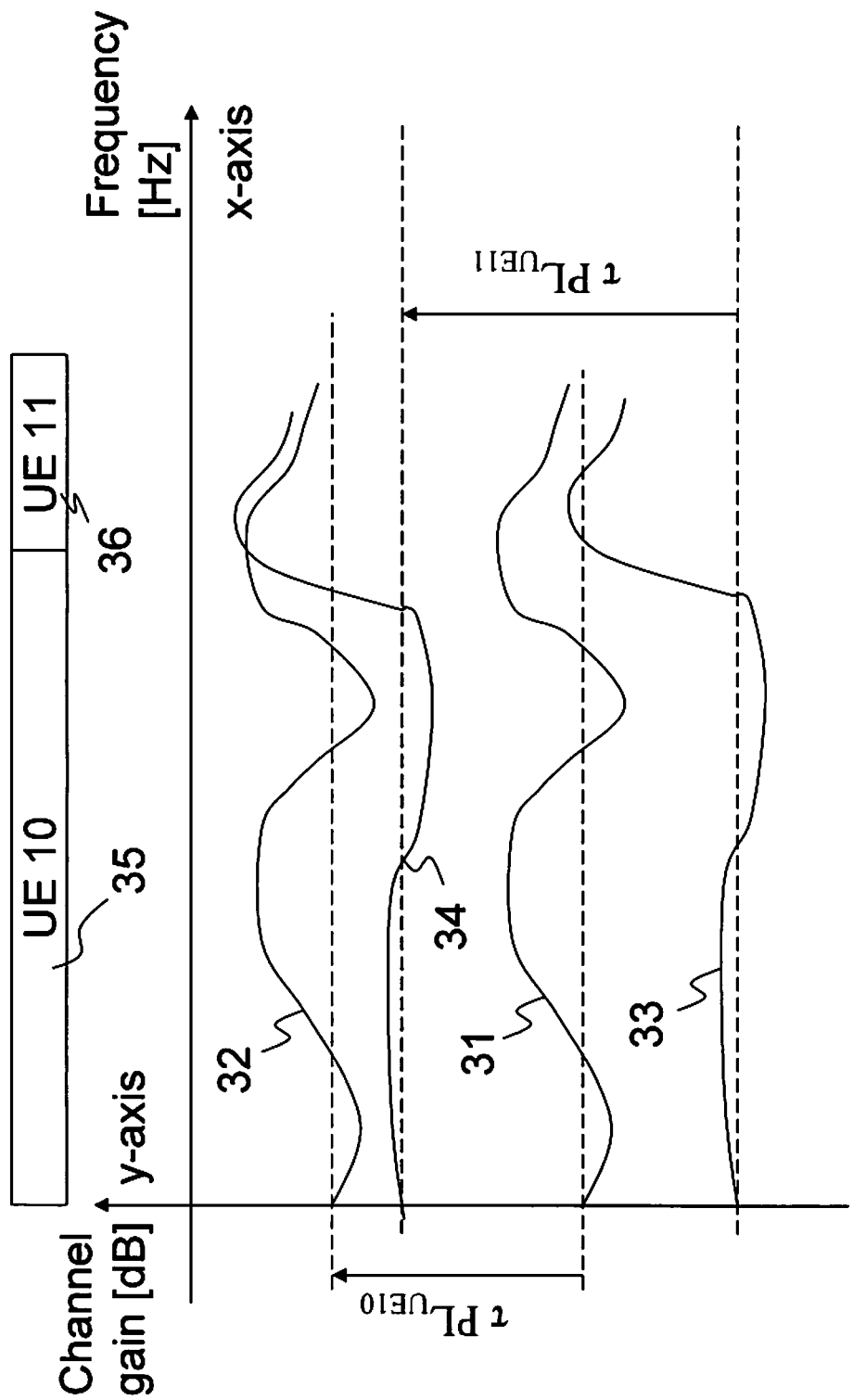
FIG. 3 is a schematic graph illustrating basis for a scheduling algorithm.

FIG. 3 is a schematic graph illustrating scheduling based on channel quality. Channel gain in decibel is defined along y axis in the graph and frequency in Hertz is defined along an x-axis.

A first curve 31 illustrates a first channel quality of the channel used by the first user equipment 10. A second curve 32 illustrates a second channel quality of the channel used by the first user equipment 10, which second channel quality is the first channel quality that has been compensated by a fraction indicator parameter r of its associated pathloss PL.

A third curve 33 illustrates a third channel quality of another channel used by the second user equipment 11. A fourth curve 34 illustrates a fourth channel quality of the other channel used by the second user equipment 11, which fourth channel quality is the third channel quality that has been compensated by a fraction indicator parameter r of its associated PathLoss PL.

When comparing the second curve 32 with the fourth curve 34 the radio base station 12 schedules the first user equipment 10 to a first range of frequencies 35 having the better channel gain of the fractional pathloss compensated channel quality. The radio base station 12 schedules the second user equipment 11 to a second range of frequencies 36 having the better channel gain of the fractional pathloss compensated channel quality due to channel variation.

The pathloss compensation is illustrated for the two user equipments 10,11 in the same cell 14 where the value of τ is less than one. The first user equipment 10 is located closer to the cell center than the second user equipment 11, i.e. the first user equipment 10 has lower pathloss. Both user equipments 10,11 are allocated their best part of the frequency spectrum, using a frequency selective scheduling algorithm. Note that the amount of pathloss compensation depends on the pathloss of the user equipment 10,11 and the value of τ.

Figure 4:
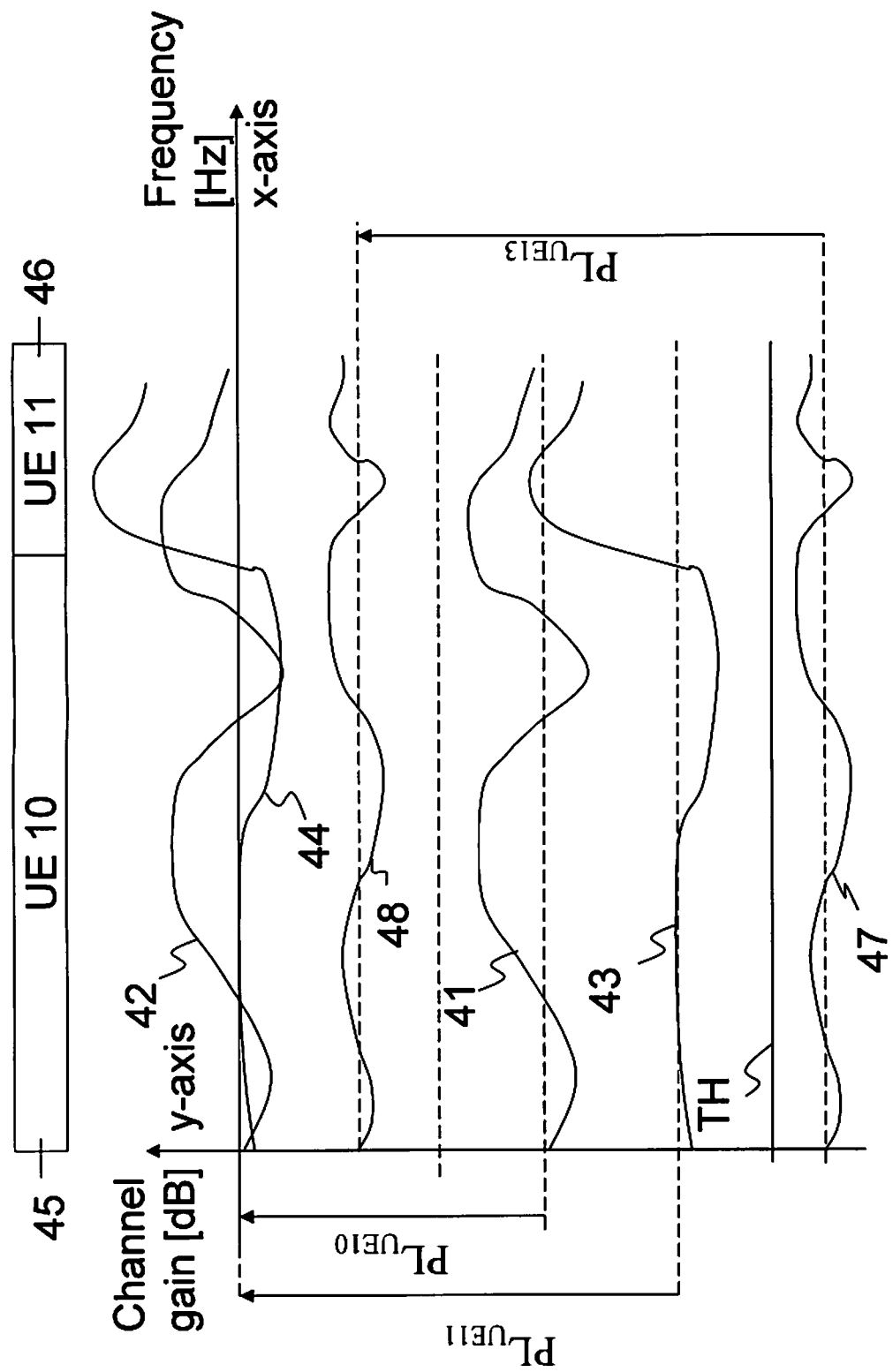
FIG. 4 is a schematic graph illustrating basis for a scheduling algorithm.

FIG. 4 is a schematic overview of a graph illustrating scheduling based on channel quality. Channel gain in decibel is defined along y axis in the graph and frequency in Hertz is defined along an x-axis. FIG. 4 shows the pathloss compensation for three user equipments 10,11,13 in the same cell 14 where the value of τ is one.

A fifth curve 41 illustrates the first channel quality of the channel used by the first user equipment 10. A sixth curve 42 illustrates the second channel quality of the channel used by the first user equipment 10, which second channel quality is the first channel quality that has been compensated by a fraction indicator parameter r of its associated pathloss PL.

A seventh curve 43 illustrates the third channel quality of the other channel used by the second user equipment 11. A eighth curve 44 illustrates the fourth channel quality of the other channel used by the second user equipment 11, which fourth channel quality is the third channel quality that has been compensated by a fraction indicator parameter τ of its associated pathloss PL.

The first user equipment 10 and the second user equipment 11 are located at locations where the pathloss is lower than $\beta \cdot PL_{cell-edge}$ denoted as threshold value TH in FIG. 4. The third user equipment 13 is located where the pathloss is higher than TH. The compensation of the third user equipment 13 is $\beta \cdot PL_{cell-edge}$ denoted as $PL_{UE13}$. The pathlosses of the first and second user equipments 10,11 are fully compensated, denoted as $PL_{UE10}$, $PL_{UE11}$ and in a resulting scheduling decision, the first and second user equipments 10,11 share the available frequency spectrum. When comparing the sixth curve 42 with the eighth curve 44 the radio base station 12 schedules the first user equipment 10 to a third range of frequencies 45 having the better channel gain of the pathloss compensated channel quality. The radio base station 12 schedules the second user equipment 11 to a fourth range of frequencies 46 having the better channel gain of the pathloss compensated channel quality due to channel variation. It should be noted that this illustrates allocation of frequency resources in uplink and therefore a bandwidth resource assigned to a user equipment is always a set of contiguous scheduling blocks (SBs) due to the constraints of the SC-FDMA transmission scheme. Thus, radio resource may be scheduled to a user equipment when the channel gain is better over an interval of frequencies. Allocating radio resources 46 to the second user equipment 11 is most beneficial, both in the perspective of the second user equipment 11, and from a cell throughput perspective.

The third user equipment 13 is only compensated to a low extent and is therefore not allocated any spectrum. A ninth curve 46 illustrates a fifth channel quality of another channel used by the third user equipment 13. A tenth curve 47 illustrates the sixth channel quality of the other channel used by the third user equipment 13, which sixth channel quality is the fifth channel quality that has been pathloss compensated by $\beta \cdot PL_{cell-edge}$.

Figure 5:
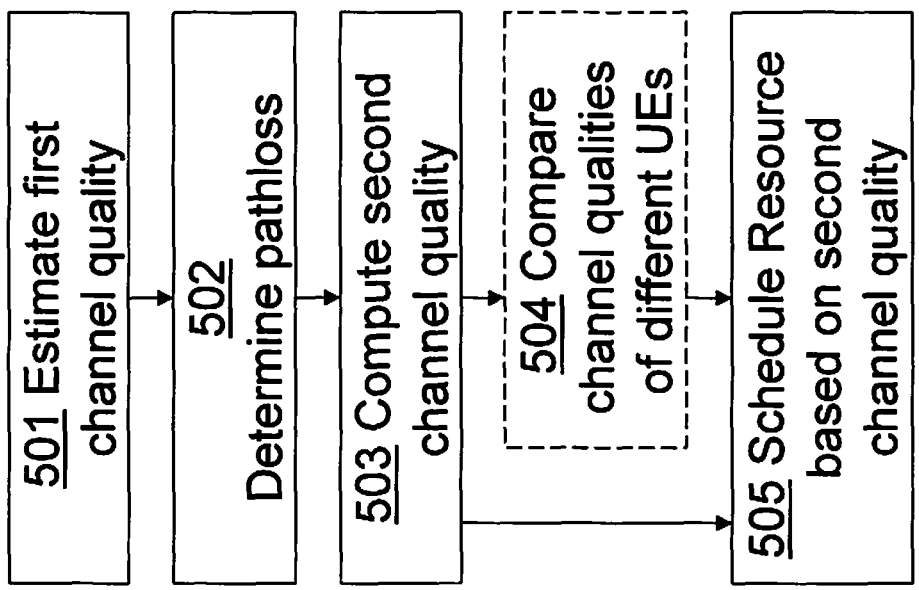
FIG. 5 is a schematic flow chart of a method in a radio base station.

The method steps in the radio base station 12 for scheduling a radio resource to a user equipment 10 according to some general embodiments will now be described with reference to a flowchart depicted in FIG. 5. The steps do not have to be taken in the order stated below, but may be taken in any suitable order. As mentioned above the radio base station 12 is comprised in the radio communications network and controls a number of radio resources to be scheduled for communication to a number of user equipments 10,11,13. The number of user equipment 10,11,13 comprises the first user equipment 10 and the number of user equipments 10,11,13 are being served by the radio base station 12. The scheduling is based on channel quality of channels used by the respective user equipment 10,11,13.

Step 501. The radio base station 12 estimates a first channel quality of a channel used by the first user equipment 10.

Step 502. The radio base station 12 determines a pathloss between the first user equipment 10 and the radio base station 12. The pathloss may be based on an indication of the pathloss received from the user equipment 10, such as a received power measurement or calculated pathloss.

Step 503. The radio base station 12 computes a second channel quality of the channel based on the estimated first channel quality and the determined pathloss. In some embodiments, a fractional of the determined pathloss is used for compensating the pathloss to the estimated first channel quality when computing the second channel quality. The fractional of the determined pathloss may in some embodiments be set from an operator or set by an automatic network tuning based on statistics in the radio communications network. The fractional may be denoted as a fractional indicator parameter $\tau$.

In some embodiments, the radio base station 12 only computes the second channel quality to a user equipment having a pathloss below a threshold value, such as $\beta \cdot PL_{cell-edge}$.

In some embodiments, the radio base station 12 estimates a first Gain to Interference and Noise Ratio, GINR, as the first channel quality of the channel. The first GINR may be based on comparison between transmitted power from the user equipment 10 and received power at the radio base station 12. Then, the radio base station 12 computes a second Gain to Interference and Noise Ratio of the channel as the second channel quality.

Step 504. In some alternative embodiments, as indicated by the dashed line, the radio base station 12 may compare the second channel quality of the first user equipment 10 with a third channel quality of another channel used by a second user equipment 11. The second user equipment 11 may be comprised in the number of user equipments 10,11,13 served by the radio base station 12. In some embodiments, the radio base station 12 may compare a first weight value of a first weight function and a second weight value of a second weight function. The first weight function may be based on the second channel quality and a rate of bits communicated over the channel used by the first user equipment 10. The second weight function may be based on the third channel quality and a rate of bits communicated over the other channel used by the second user equipment 11.

In some embodiments, the third channel quality may be computed for the other channel of the second user equipment 11 based on an estimated fourth channel quality of the other channel and a pathloss between the second user equipment 11 and the radio base station 12.

Step 505. The radio base station 12 schedules a radio resource out of the number of radio resources to the first user equipment 10 based on the computed second channel quality. The scheduling may be based on an outcome of the step of comparing Step 504.

The radio base station 12 may schedule the radio resource to the first user equipment 10 by prioritizing the first user equipment when the second channel quality is better than the third channel quality or, in some embodiments, when the first weight value is larger than the second weight value.

Figure 6:
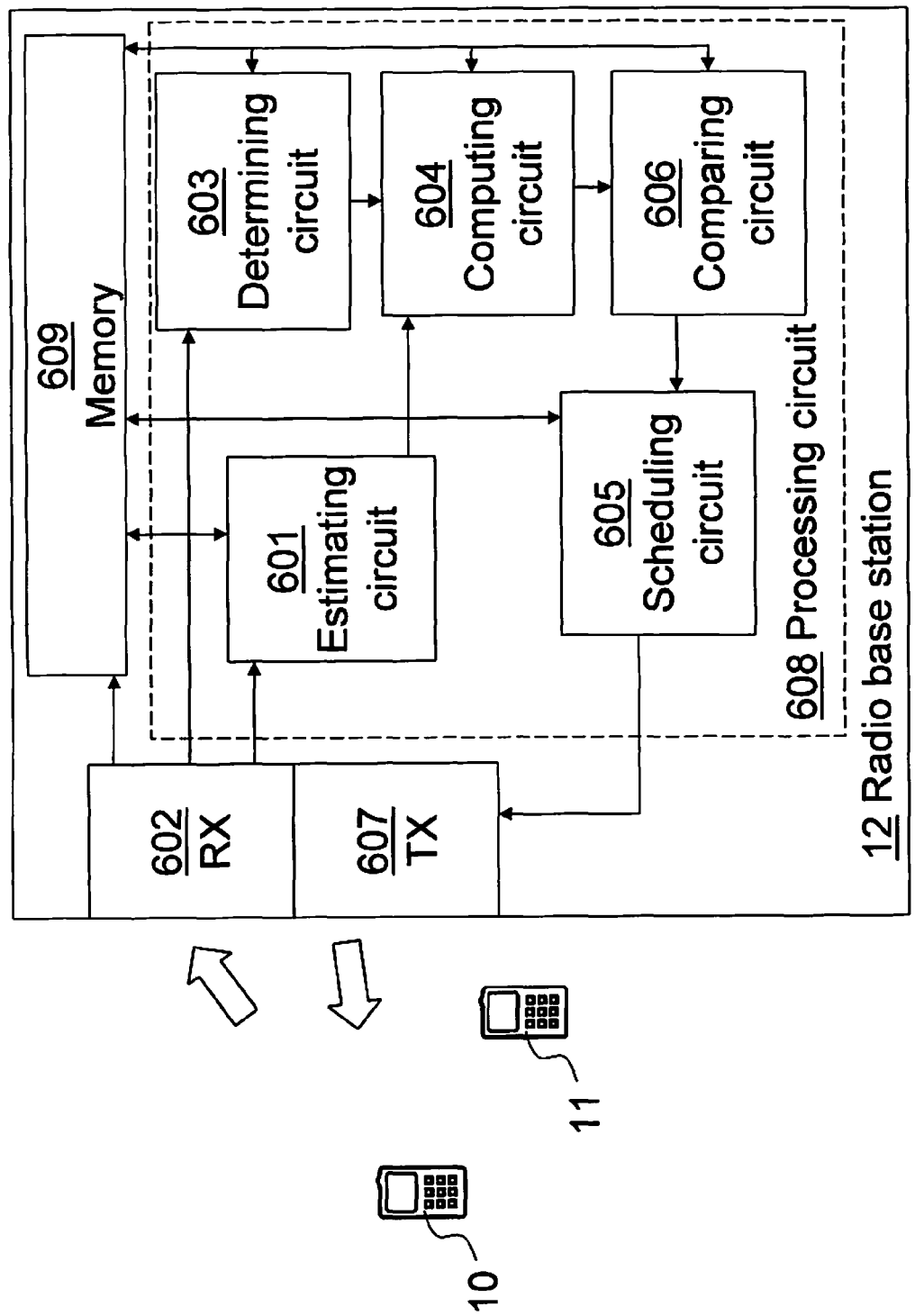
FIG. 6 is a block diagram of a radio base station.

In order to perform the methods a radio base station 12 for scheduling a radio resource to the first user equipment 10 is provided. FIG. 6 is a block diagram depicting a radio base station 12. The radio base station 12 is arranged to be comprised in the radio communications network and to control a number of radio resources to be scheduled for communication to a number of user equipments. The number of user equipment comprises the first user equipment 10 and are served by the radio base station 12. The radio base station 12 is arranged to schedule radio resources based on channel quality of channels used by the respective user equipments 10,11,13. The radio base station 12 comprises an estimating circuit 601 configured to estimate a first channel quality of a channel used by the first user equipment 10. In some embodiments, the radio base station 12 may comprise a receiving arrangement 602 and the estimating circuit 601 may be configured to estimate the first channel quality based on a measurement on a signal received at the receiving arrangement 602.

The radio base station 12 also comprises a determining circuit 603 configured to determine a pathloss between the first user equipment 10 and the radio base station 12. The pathloss may be based on an indication of the pathloss received from the user equipment 10, such as a received power measurement or calculated pathloss, over the receiving arrangement 602 or stored at the radio base station 12. Furthermore, the radio base station 12 comprises a computing circuit 604 configured to compute a second channel quality of the channel based on the first channel quality and the determined pathloss. The computing circuit 604 may in some embodiments be further configured to use a fractional of the determined pathloss for compensating the determined pathloss to the first channel quality. In addition, the computing circuit 604 may in some embodiments further be configured to compute the second channel quality only on a user equipment having a pathloss below a threshold value.

In some embodiments, the estimating circuit 601 may be configured to estimate a first Gain to Interference and Noise Ratio of the channel based on comparison between transmitted power from the first user equipment 10 and received power at the radio base station 12. Then, the computing circuit 604 may further be configured to compute a second Gain to Interference and Noise Ratio of the channel.

The radio base station 12 further comprises a scheduling circuit 605 arranged to schedule a radio resource out of the number of radio resources to the user equipment 10 based on the computed second channel quality.

The radio base station 12 may in some embodiments comprise a comparing circuit 606 arranged to compare the second channel quality of the user equipment 10 referred to as a first user equipment 10, with a third channel quality of another channel used by a second user equipment 11. The second user equipment 11 is comprised in the number of user equipments 10,11,13. The scheduling circuit 605 is then arranged to schedule the radio resource based on the comparison. The comparing circuit 606 may be arranged to compare a first weight value of a first weight function and a second weight value of a second weight function. The first weight function is based on the second channel quality and a first rate of bits communicated over the channel used by the first user equipment 10. The second weight function is based on the third channel quality and a second rate of bits communicated over the other channel used by the second user equipment 11. The scheduling circuit 605 may be arranged to prioritize to schedule the radio resource to the first user equipment when the second channel quality is better than the third channel quality or when the first weight value is larger than the second weight value.

The third channel quality may be computed in the computing circuit 604 for the other channel of the second user equipment 11. The computed third channel quality may be based on an estimated fourth channel quality of the other channel from the estimating circuit 601 and a pathloss between the second user equipment 11 and the radio base station 12 determined at the determining circuit 603.

The radio base station 12 may then transmit scheduling information, for example, DCI, to the user equipment 10 over a transmitting arrangement TX 607.

The present mechanism for scheduling a radio resource to the user equipment 10 may be implemented through one or more processors, such as a processing circuit 608 in the radio base station 12 depicted in FIG. 6, together with computer program code for performing the functions of the embodiments herein. The program code mentioned above may also be provided as a computer program product, for instance in the form of a data carrier carrying computer program code for performing embodiments when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

The radio base station may further comprise a memory 609 comprising one or more memory units. The memory is arranged to be used to store data such as estimates, pathlosses, channel qualities, schedulings, and applications to perform the methods herein when being executed in the radio base station 12.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method, in a radio base station, for scheduling a radio resource to a first user equipment (UE), the radio base station in a radio communications network and controlling a plurality of radio resources to be scheduled for communication to a plurality of UEs based on channel quality of channels used by the respective UEs, the plurality of UEs served by the radio base station and comprising the first UE, the method comprising:
   estimating a first channel quality of a channel used by the first UE based on a comparison between transmitted power from the first UE and received power at the radio base station;
   determining a pathloss between the first UE and the radio base station, wherein the first UE is currently served by the radio base station;
   selectively applying pathloss compensation to the pathloss to obtain a compensated pathloss;
   computing a second channel quality of the channel based on the estimated first channel quality and the compensated pathloss; and
   scheduling a radio resource out of the plurality of radio resources to the first UE based on the computed second channel quality.

2. The method of claim 1, wherein a fraction of the determined pathloss is used for compensating the pathloss to the estimated first channel quality in computing the second channel quality.

3. The method of claim 1:
   further comprising comparing the pathloss to a threshold value;
   wherein the computing the second channel quality is selectively performed based on the comparing such that the second channel quality is computed only when the pathloss is below the threshold value.

4. The method of claim 1, wherein the determining the pathloss is based on an indication of the pathloss received from the first UE.

5. The method of claim 1:
   wherein the estimating the first channel quality comprises estimating a first Gain to Interference and Noise Ratio (GINR) of the channel based on the comparison between the transmitted power from the first UE and the received power at the radio base station;
   wherein computing the second channel quality comprises computing a second GINR of the channel.

6. The method of claim 1, further comprising:
comparing the second channel quality with a third channel quality of another channel used by a second UE, the second UE in the plurality of UEs;
wherein the scheduling the radio resource is based on the comparison.

7. The method of claim 6:
wherein the comparing comprises comparing a first weight value of a first weight function and a second weight value of a second weight function;
wherein the first weight function is based on the second channel quality and a rate of bits communicated over the channel used by the first UE;
wherein the second weight function is based on the third channel quality and a rate of bits communicated over the other channel used by the second UE.

8. The method of claim 6, further comprising computing the third channel quality based on an estimated fourth channel quality of the another channel and a pathloss between the second UE and the radio base station.

9. The method of claim 1, wherein selectively applying the pathloss compensation includes applying the pathloss compensation to control a degree of fairness between the plurality of UEs served by the radio base station.

10. A radio base station for scheduling a radio resource to a first user equipment (UE), the radio base station configured to be in a radio communications network, the radio base station configured to control a plurality of radio resources to be scheduled for communication to a plurality of UEs based on channel quality of channels used by the respective UEs, the plurality of UEs served by the radio base station and comprising the first UE, the radio base station comprising:
an estimating circuit configured to estimate a first channel quality of a channel used by the first UE based on a comparison between transmitted power from the first UE and received power at the radio base station;
a determining circuit configured to:
determine a pathloss between the first UE and the radio base station, wherein the first UE is currently served by the radio base station; and
selectively applying pathloss compensation to the pathloss to obtain a compensated pathloss;
a computing circuit configured to compute a second channel quality of the channel based on the first channel quality and the compensated pathloss; and
a scheduling circuit configured to schedule a radio resource out of the plurality of radio resources to the first UE based on the computed second channel quality.

11. The radio base station of claim 10, wherein the computing circuit is further configured to use a fraction of the determined pathloss for compensating the determined pathloss to the first channel quality.

12. The radio base station of claim 10, wherein the computing circuit is configured to selectively compute the second channel quality only when the first UE has a pathloss below a threshold value.

13. The radio base station of claim 10, wherein the determining circuit is further configured to determine the pathloss based on an indication of the pathloss received from the first UE.

14. The radio base station of claim 10:
wherein the estimating circuit is configured to estimate a first Gain to Interference and Noise Ratio (GINR) of the channel based on the comparison between the transmitted power from the first UE and the received power at the radio base station;
wherein the computing circuit is configured to compute a second GINR of the channel.

15. The radio base station of claim 10:
further comprising a comparing circuit configured to compare the second channel quality with a third channel quality of another channel used by a second UE, the second UE in the plurality of UEs;
wherein the scheduling circuit is configured to schedule the radio resource based on the comparison.

16. The radio base station of claim 15:
wherein the comparing circuit is configured to compare a first weight value of a first weight function to a second weight valued of a second weight function;
wherein the first weight function is based on the second channel quality and a first rate of bits communicated over the channel used by the first UE;
wherein the second weight function is based on the third channel quality and a second rate of bits communicated over the another channel used by the second UE.

17. The radio base station of claim 15, wherein the computing circuit is configured to compute the third channel quality based on an estimated fourth channel quality of the another channel from the estimating circuit and a pathloss between the second UE and the radio base station determined at the determining circuit.

18. The radio base station of claim 10, wherein selectively applying the pathloss compensation includes the determining circuit being further configured to apply the pathloss compensation to control a degree of fairness between the plurality of UEs served by the radio base station.

* * * * *